United States Patent
Hall

(10) Patent No.: US 7,267,221 B2
(45) Date of Patent: Sep. 11, 2007

(54) SILENT MODULAR CONVEYOR AND CONVEYOR LINKS

(75) Inventor: William C. Hall, Denver, NC (US)

(73) Assignee: Ramsey Products Corporation, Charlotte, NC (US)

(*) Notice: Subject to any disclaimer, the term of this patent is extended or adjusted under 35 U.S.C. 154(b) by 0 days.

(21) Appl. No.: 10/830,817

(22) Filed: Apr. 23, 2004

(65) Prior Publication Data

US 2004/0211651 A1 Oct. 28, 2004

Related U.S. Application Data

(60) Provisional application No. 60/465,940, filed on Apr. 28, 2003.

(51) Int. Cl.
*B65G 17/06* (2006.01)
(52) U.S. Cl. .................................. 198/853; 198/850
(58) Field of Classification Search ......... 198/848–853
See application file for complete search history.

(56) References Cited

U.S. PATENT DOCUMENTS

| | | | |
|---|---|---|---|
| 2,722,843 A * | 11/1955 | Edwards, Jr. | ............... 474/213 |
| 3,602,364 A | 8/1971 | Maglio | |
| 3,672,488 A | 6/1972 | Collins | |
| 3,980,173 A | 9/1976 | Riggs | |
| 4,283,184 A | 8/1981 | Berg | |
| 4,436,200 A | 3/1984 | Hodlewsky et al. | |
| 4,708,701 A | 11/1987 | Cole, Jr. | |
| 4,976,662 A | 12/1990 | Miranti, Jr. | |
| 4,993,543 A * | 2/1991 | Lapeyre | ....................... 198/853 |
| 5,020,659 A | 6/1991 | Hodlewsky | |
| 5,125,504 A | 6/1992 | Corlett et al. | |
| 5,303,818 A | 4/1994 | Gruettner et al. | |
| 5,402,880 A | 4/1995 | Murphy | |
| 5,435,789 A | 7/1995 | Avramidis | |
| 5,573,106 A | 11/1996 | Stebnicki | |
| 5,683,319 A | 11/1997 | Mott et al. | |
| 5,690,571 A | 11/1997 | Mott | |
| 5,758,484 A | 6/1998 | Ledvina et al. | |
| 5,800,301 A | 9/1998 | Anderson | |
| 5,857,933 A | 1/1999 | Patton | |
| 5,941,059 A | 8/1999 | Kanehira et al. | |
| 5,989,141 A | 11/1999 | Kozakura et al. | |
| 6,045,473 A | 4/2000 | Matsumoto et al. | |
| 6,155,944 A | 12/2000 | Matsuda | |
| 6,161,685 A | 12/2000 | Stebnicki | |

(Continued)

FOREIGN PATENT DOCUMENTS

| | | |
|---|---|---|
| DE | 10033499 A | 1/2002 |
| EP | 1184304 A | 3/2002 |
| FR | 1104632 A | 11/1955 |
| GB | 838115 A | 6/1960 |
| GB | 2007180 A | 5/1979 |

*Primary Examiner*—James R. Bidwell
(74) *Attorney, Agent, or Firm*—Adams Evans P.A.

(57) ABSTRACT

A silent modular conveyor link adapted for assembly with multiple complementary links to form a conveyor. The conveyor includes a support for supporting items to be conveyed on the conveyor. A plurality of silent teeth extend downwardly from the support for mating engagement with a sprocket gear and for mating alignment with teeth in a complementary link for articulating movement relative to the complementary link. An opening in at least some of the teeth are provided for receiving a link pin for connecting the multiple conveyor links together to form an endless conveyor. Both genderless and male/female conveyor links are disclosed.

9 Claims, 11 Drawing Sheets

U.S. PATENT DOCUMENTS

| | | |
|---|---|---|
| 6,244,983 B1 | 6/2001 | Matsuda |
| 6,325,735 B1 * | 12/2001 | Kanehira et al. ........... 474/212 |
| 6,360,881 B2 | 3/2002 | Stebnicki et al. |
| 6,450,910 B1 | 9/2002 | Matsumoto et al. |
| 6,564,933 B2 * | 5/2003 | Morimoto et al. .......... 198/850 |

* cited by examiner

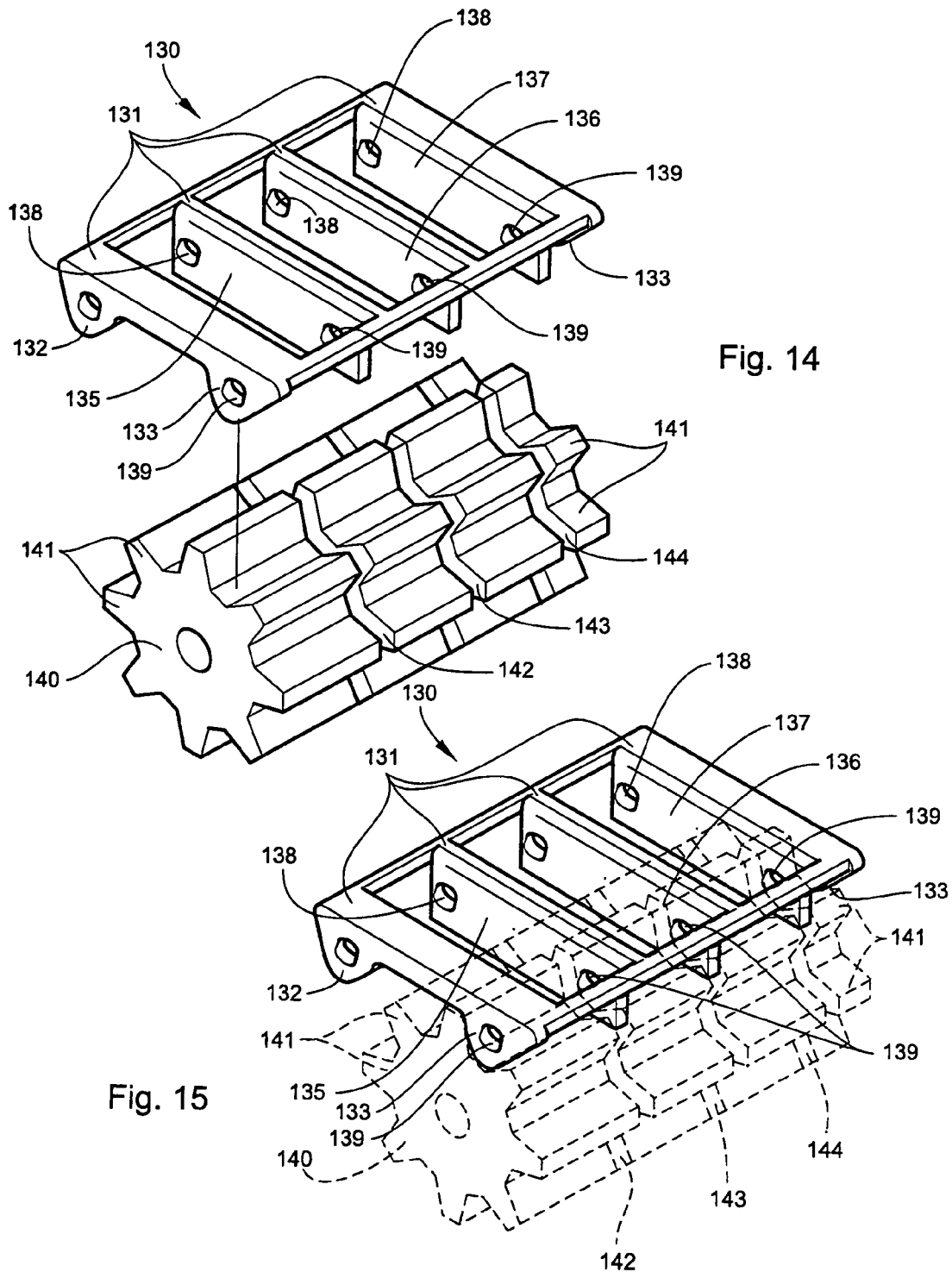

SILENT MODULAR CONVEYOR AND CONVEYOR LINKS

This application is based on and claims priority from Provisional Patent Application Ser. No. 60/465,940, filed on Apr. 28, 2003.

TECHNICAL FIELD AND BACKGROUND OF THE INVENTION

This invention relates to silent modular conveyors and conveyor links of several designs. A silent chain is a series of toothed links alternately assembled with pins or a combination of joint components in such a way that the joint articulates between adjoining pitches. ANSI 1.1, B29.2M-1982. The link contour may vary but will engage sprocket teeth, either standard or non-standard designs, so that joint centers lie on a sprocket pitch circle. The toothed links define spaces between the teeth for being driven by a sprocket over which the connected links pass.

This application discloses a unique combination of silent chains and conveyor chains by providing conveyor-type modular links with silent chain teeth. Such chains are frequently used in transporting and conveying materials either as a conveying surface or as the means for moving other containers in which a conveyed material is placed.

SUMMARY OF THE INVENTION

Therefore, it is an object of the invention to provide a conveyor link that utilizes silent chain-type teeth.

It is another object of the invention to provide a conveyor link that utilizes silent chain-type teeth on both driving and load-bearing links, and that may act as a guide link to assure proper chain and sprocket alignment, support and distribute vertical loading that is created by objects placed on the conveyor, acts as both a guiding link and load bearing link in the same module, and/or utilize silent chain type teeth, guide link and load bearing features all in the same module.

It is another object of the invention to provide a conveyor link that permits a conveyor to be constructed out of various combinations of drive and load-bearing links.

It is another object of the invention to provide a conveyor that is constructed of links having silent chain teeth and that includes links assembled in both lengthwise and widthwise arrays.

These and other objects of the present invention are achieved in the preferred embodiments disclosed below by providing a silent modular conveyor link adapted for assembly with multiple complementary links to form a conveyor. The conveyor link comprises a support for supporting items to be conveyed, a plurality of silent teeth extending downwardly from the support for mating engagement with a sprocket gear and for overlapping concentric alignment with teeth in a complementary link for articulating movement relative to the complementary link. An opening is provided in at least some of the teeth for receiving a link pin for connecting the multiple links together to form an endless conveyor.

According to one preferred embodiment of the invention, the support defines a male end carrying a first group of the teeth and a female end carrying a second group of teeth, the first group of teeth adapted for concentric connection with the second group of teeth of a complementary conveyor link.

According to another preferred embodiment of the invention, the male end of the support comprises an outwardly-projecting portion of the support adapted for being received in a recess formed in the female end of a complementary conveyor link.

According to yet another preferred embodiment of the invention, the teeth are integrally-formed with the support.

According to yet another preferred embodiment of the invention, the conveyor link and the complementary links are identical.

According to yet another preferred embodiment of the invention, the first group of the teeth of the male portion of the support are positioned for concentric inboard alignment with the second group of the teeth of the female portion of the support.

According to yet another preferred embodiment of the invention, the conveyor link comprises first and second pairs of teeth positioned in spaced-apart relation on opposing lateral sides of the support. The conveyor link is adapted for being attached by a carriage link to a like conveyor link to form a conveyor.

According to yet another preferred embodiment of the invention, the combination of the conveyor link with a carriage link is provided, the carriage link comprising a body having first and second pairs of teeth positioned in spaced-apart relation on opposing lateral sides of the body, the first and second pairs of teeth of the carriage link being laterally spaced-apart for being positioned in concentric alignment with respective first and second pairs teeth of the conveyor link and joined together by a link pin.

According to yet another preferred embodiment of the invention, the support includes at least one opening therein.

According to yet another preferred embodiment of the invention, the conveyor links are adapted for being connected together side-to-side and end-to-end to form an endless conveyor having a width that is a predetermined multiple of the length and width of a single conveyor link.

According to yet another preferred embodiment of the invention, a silent modular conveyor link is provided, and is adapted for assembly with multiple complementary links to form a conveyor. The conveyor link comprises a support for supporting items to be conveyed on the conveyor, a plurality of silent teeth extending downwardly from the support for mating engagement with a sprocket gear and for overlapping concentric alignment with teeth in a complementary link for articulating movement relative to the complementary link, and an opening in at least some of the teeth for receiving a link pin for connecting the multiple conveyor links together to form an endless conveyor.

According to yet another preferred embodiment of the invention, the conveyor includes a plurality of first conveyor links, each of the first conveyor links having a support for supporting items to be conveyed on the conveyor, a plurality of silent teeth extending downwardly from the support for mating engagement with a sprocket gear, and an opening in at least some of the teeth for receiving a link pin. The conveyor also comprises a plurality of second conveyor links, each of the second conveyor links having a support for supporting items to be conveyed on the conveyor, a plurality of silent teeth extending downwardly from the support, the teeth being spaced and positioned to reside concentrically-adjacent to respective teeth of the first conveyor links for alignment with and articulating movement relative to the first conveyor links, and an opening in at least some of the teeth for receiving a link pin for connecting the plurality of first conveyor links and the plurality of second conveyor links together to form an endless conveyor wherein the plurality of first conveyor links and second conveyor links alternate along the length of and across the width of the conveyor.

According to yet another preferred embodiment of the invention, the silent teeth of the second conveyor links are shaped and spaced for mating engagement with the sprocket gear.

According to yet another preferred embodiment of the invention, at least some of the first conveyor links or at least some of the second conveyor links have openings in the their respective supports.

According to yet another preferred embodiment of the invention, a modular conveyor is provided and includes a plurality of driving links. Each of the driving links has a support for supporting items to be conveyed on the conveyor, a plurality of silent teeth extending downwardly from the support for mating engagement with a sprocket gear, and an opening in at least some of the teeth for receiving a link pin. The conveyor also includes a plurality of load-bearing links. Each of the load-bearing links has a support for supporting items to be conveyed on the conveyor. Openings are formed in the load-bearing links for being positioned in alignment with the teeth of the driving links and for receiving a link pin for connecting the plurality of driving links and the plurality of load-bearing links together to form an endless conveyor.

According to yet another preferred embodiment of the invention, the driving links include at least one load-bearing plate positioned intermediate a pair of laterally spaced-apart teeth.

According to yet another preferred embodiment of the invention, the teeth of the driving links and the load-bearing plates of the load-bearing links are integrally-formed with the respective supports.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 14 and 15 are perspective views of a conveyor link according to a further embodiment of the invention.

DESCRIPTION OF THE PREFERRED EMBODIMENT AND BEST MODE

Figure 1:
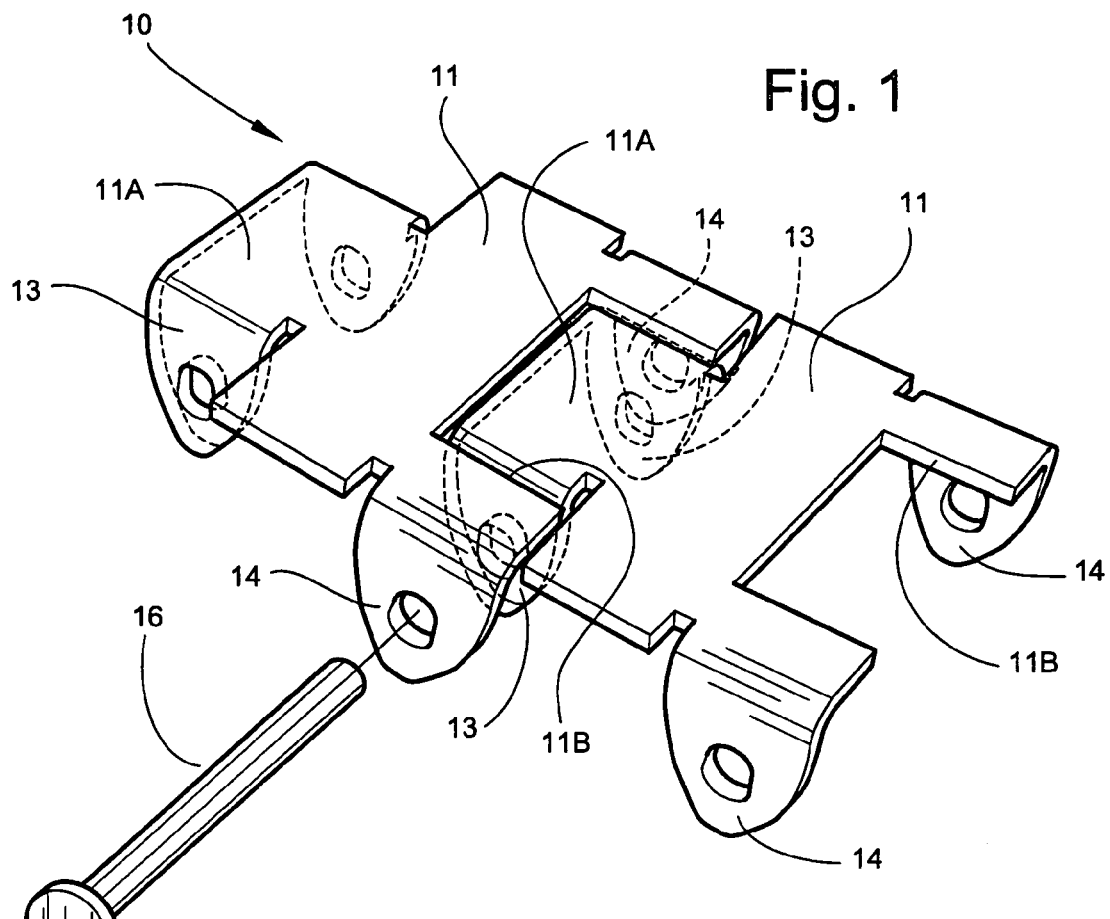
FIG. 1 is a perspective view of two connected conveyor links of a male/female-type silent modular conveyor chain.
Figure 2:
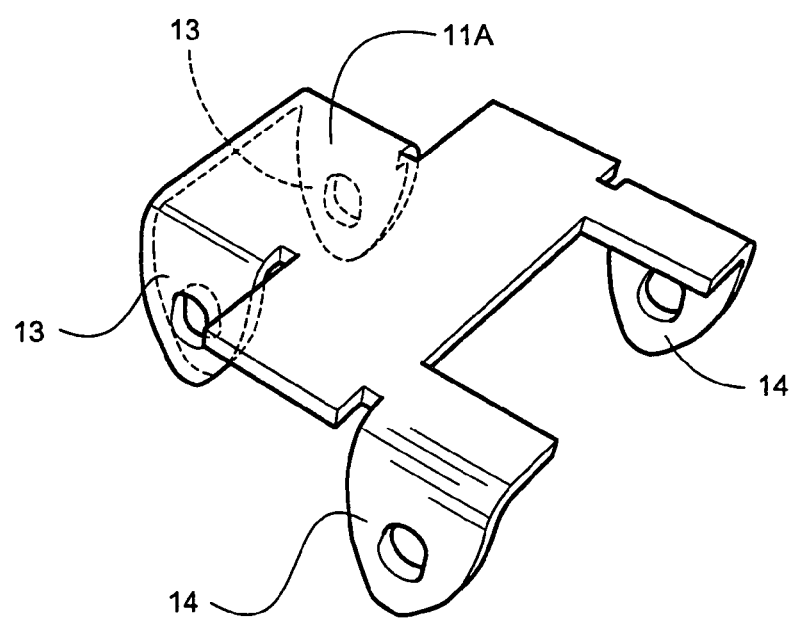
FIG. 2 is a perspective view of one of the links shown in FIG. 1.
Figure 3:
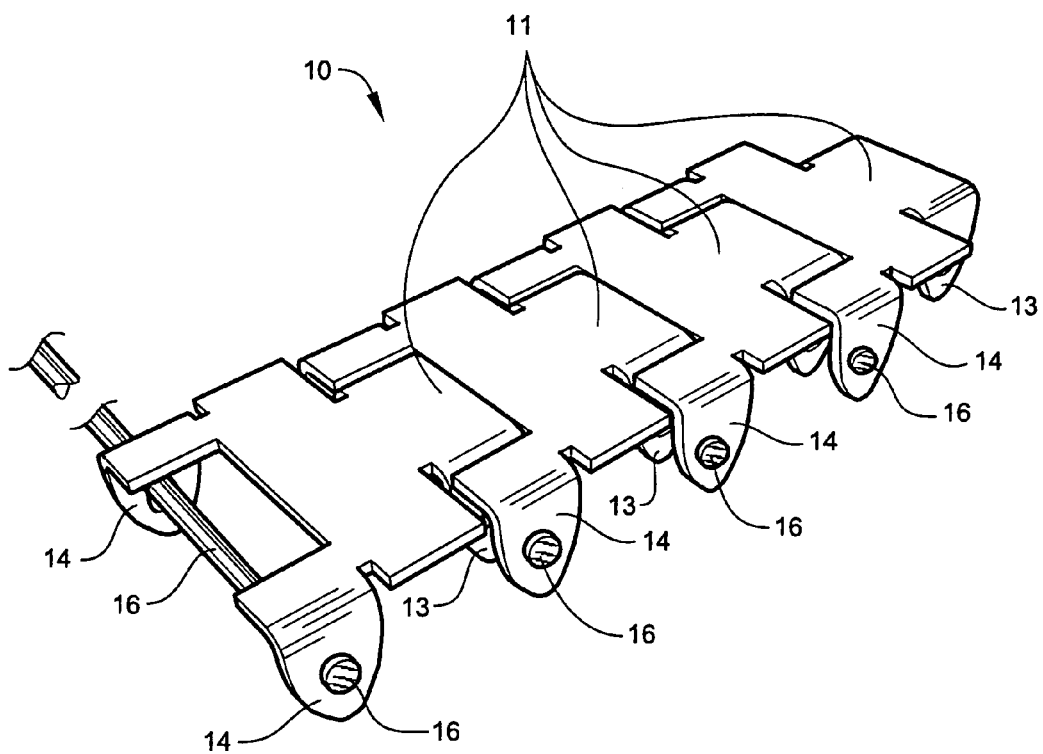
FIG. 3 is a perspective view of length of silent modular link conveyor chain according to FIGS. 1 and 2.

Referring now specifically to the drawings, a short segment of a silent modular link conveyor 10 according to one embodiment of the present invention is illustrated in FIG. 1 and shown generally at reference numeral 10. The individual conveyor links 11 are formed in a male/female design with an outwardly-projecting forward end 11A of one conveyor link 11 fitting into a recess 11B in the trailing end of another like conveyor link 11. See FIG. 2. Pairs of teeth 13 and 14 are positioned, as shown, on opposing sides of the conveyor link 11 and permit the conveyor links 11 to be joined by alignment of teeth 13 on the trailing conveyor link 11 with teeth 14 on the leading conveyor link 11. A link pin 16 is inserted through an opening in the aligned teeth 13 and 14, fastening the adjacent conveyor links 11 together. The entire conveyor 10 having many conveyor links 11 is built in the same manner. See FIG. 3. Once inserted, a head is formed on the leading end of the link pin 16 to join the conveyor links 11 together. Of course, as many of the conveyor links 11 are assembled widthwise to make up a conveyor 10 having the desired width held in the assembled state by link pins 16 of suitable length.

The teeth 13, 14 are shaped as conventional silent chain teeth, meeting all of the industry standards, as set out above. Articulation of the conveyor links around standard silent chain sprockets is thereby facilitated.

The conveyor links 11 may be formed by molding, casting, stamping or other standard processes. Materials may include metals such as aluminum, brass, iron or steel, plastics, carbon fiber and various resins. The selected material dictates the preferred fabrication method. One preferred manufacturing method is to stamp the conveyor links from flat sheet stock of any desired metal, the side edge areas forming the teeth 13, 14 appearing as outwardly-projecting ears. The edge areas are then bent downwardly 90 degrees into the orientation shown in FIGS. 1 and 2 with the ears depending downwardly in a plane normal to the plane of the conveyor link to form the teeth 13, 14.

Figure 4:
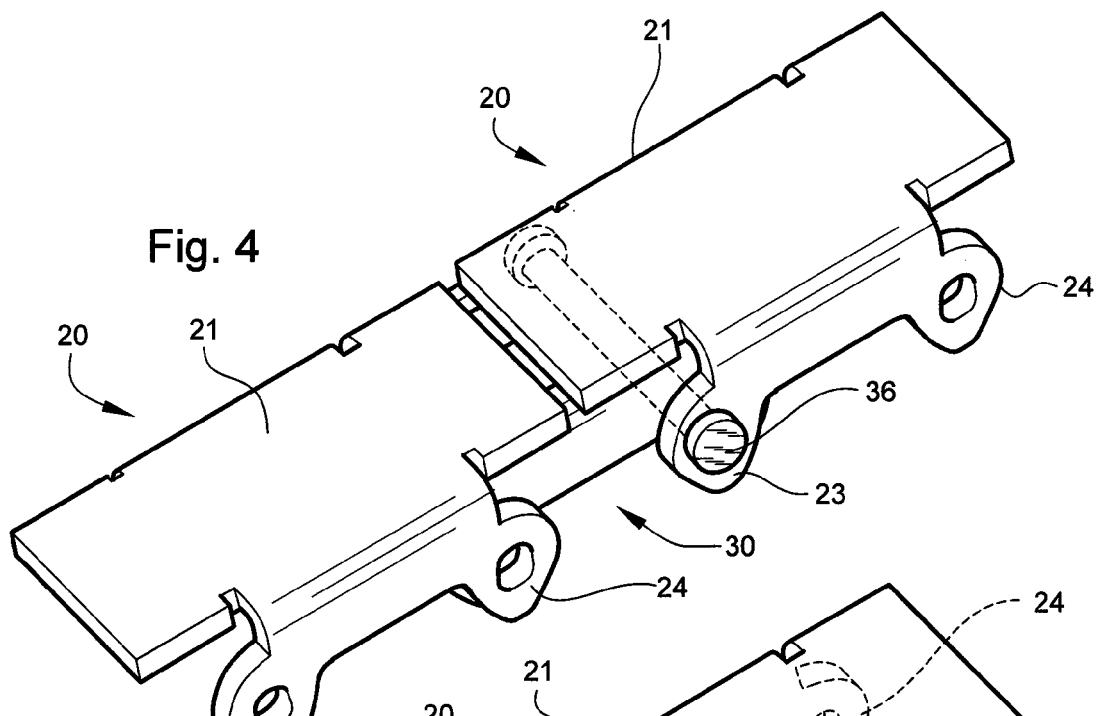
FIG. 4 is a perspective view of an alternative embodiment of a silent modular conveyor chain.
Figure 5:
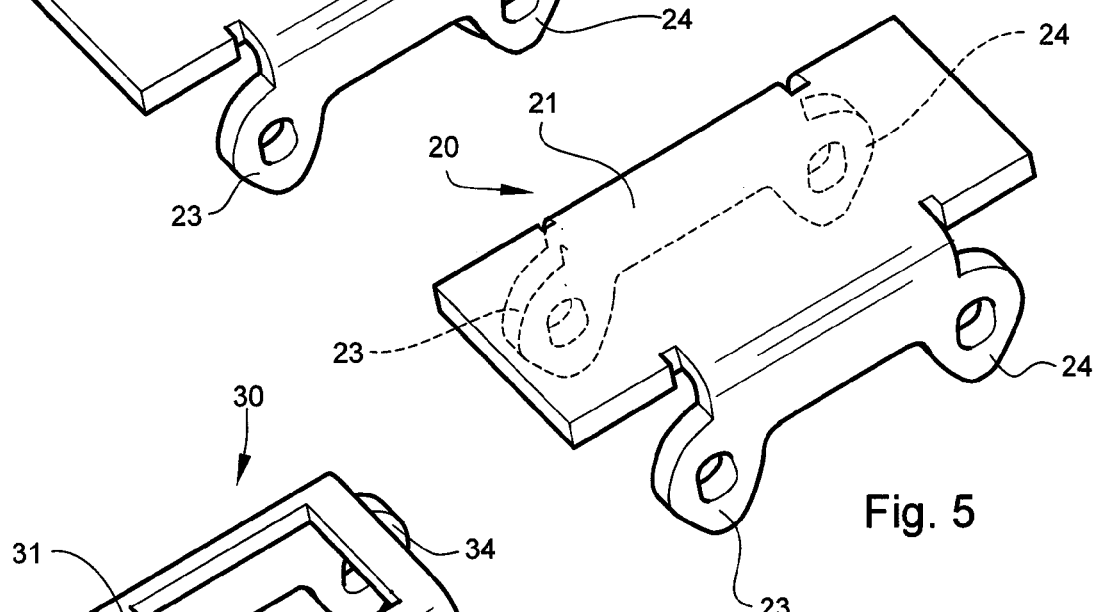
FIG. 5 is a perspective view of one of the plate conveyor link components of the embodiment shown in FIG. 3.
Figure 6:
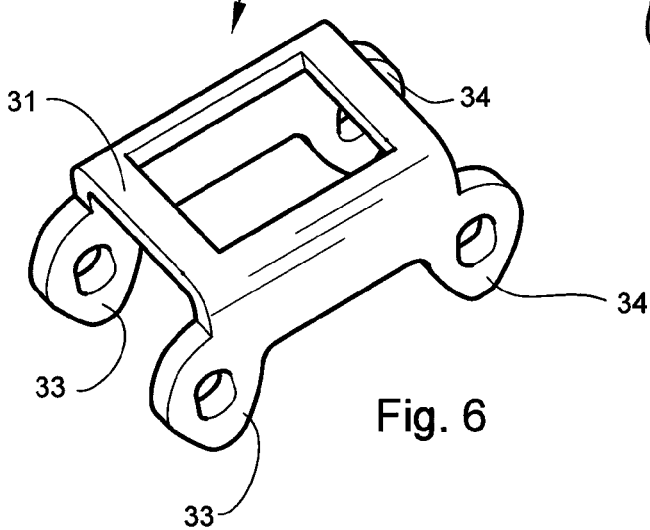
FIG. 6 is a perspective view of the carriage link component of the embodiment shown in FIG. 3.

Referring now to FIGS. 4, 5 and 6, an alternative embodiment is shown, and comprises plate conveyor links 20 connected together by carriage links 30. Each plate conveyor link 20 includes a support 21 and pairs of opposing, downwardly-extending silent chain teeth 23, 24. Each carriage link 30 comprises a support frame 31 and pairs of opposing, downwardly-extending silent chain teeth 33, 34. Adjacent plate conveyor links 20 are connected by a carriage link 30 in the manner shown in FIG. 3, with aligned teeth 23 and 33, and aligned teeth 23 and 34 each pinned with a pin 36. The connected plate conveyor links 20 are permitted to articulate around the silent chain sprockets by the action of the teeth 23, 24 and 33, 34 around the pin 36. The particular plate conveyor link 20 and the carriage link 30 shown in FIGS. 4, 5 and 6 are each "genderless", i.e., they are reversible end-to-end.

Materials and fabrication techniques for the plate conveyor link 20 and carriage link 30 are as described above with reference to conveyor 10.

Figure 7:
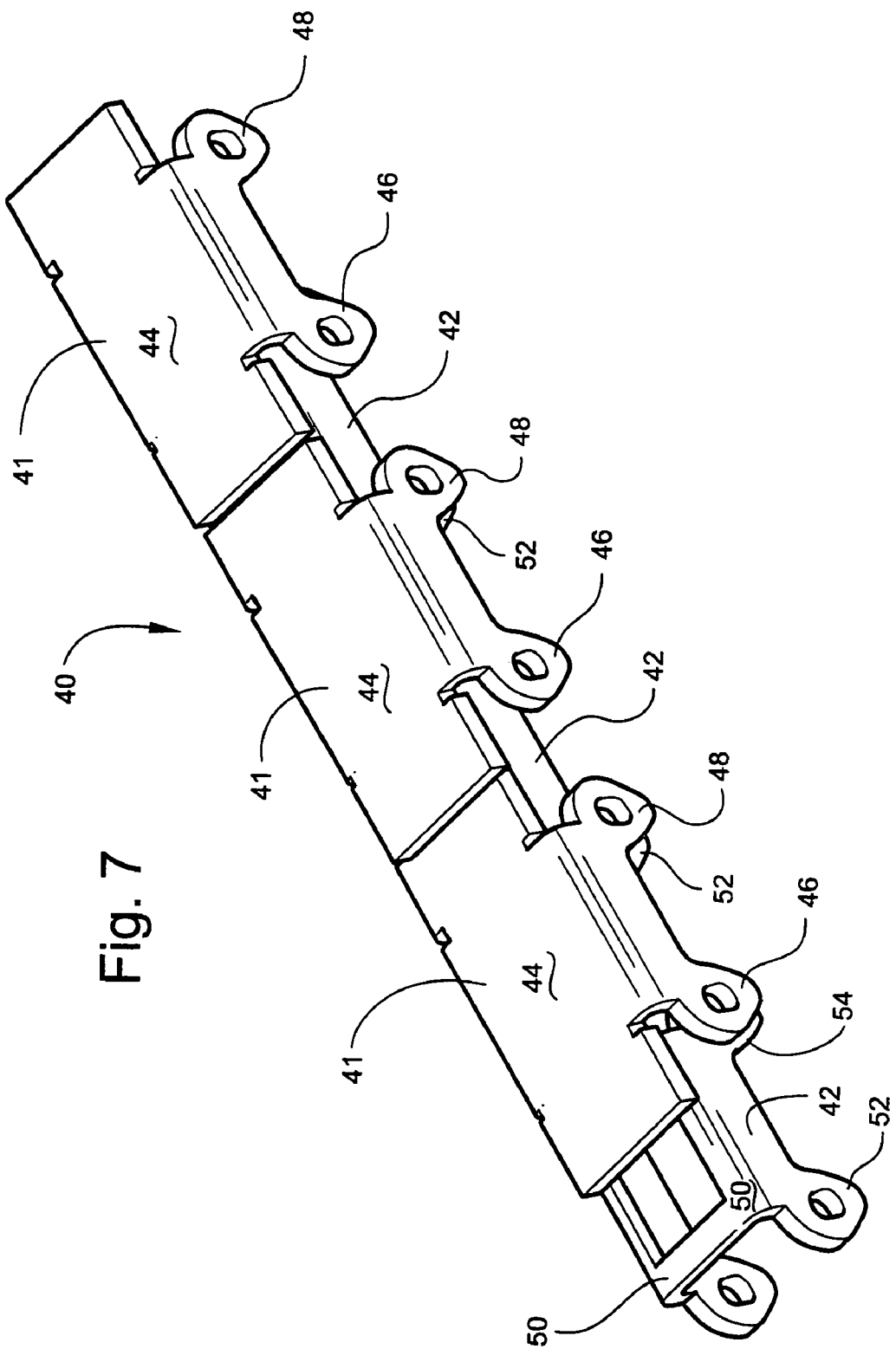
FIG. 7 is a perspective view of a further embodiment of a silent modular conveyor link conveyor chain.

A similar design is shown in FIG. 7. The conveyor 40 comprises plate conveyor links 41 connected together by carriage links 42. Each plate conveyor link 41 includes a support plate 44 and pairs of opposing, downwardly-extending silent chain teeth 46, 48. Each carriage conveyor link 42 comprises a support frame 50 and pairs of opposing, downwardly-extending silent chain teeth 52, 54. Adjacent plate conveyor links 41 are connected by a carriage link 42 in the manner shown in FIG. 6, with aligned conveyor links 46, 54, and aligned conveyor links 48, 52, each pinned with a pin, not shown. The connected plate conveyor links 41 are permitted to articulate around the silent chain sprockets by the action of the teeth 46, 54 and 48, 52 around the pin. These particular plate conveyor links 41 and the carriage links 42 are each "genderless", i.e., they are reversible end-to-end.

Materials and fabrication techniques for the conveyor 40 and its plate conveyor links 41 and carriage links 42 are as described above with reference to conveyor chain 10.

Figure 8:
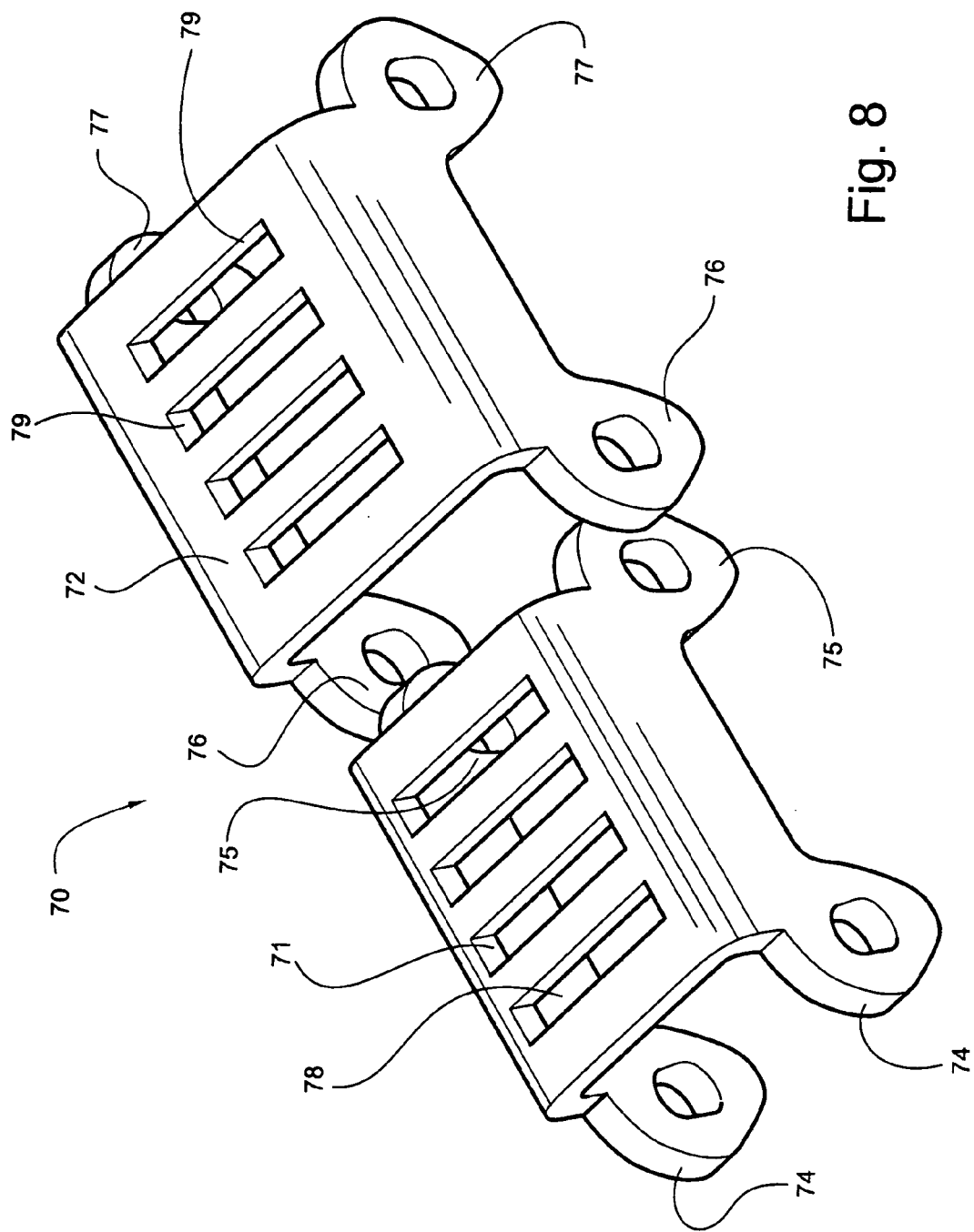
FIG. 8 is a perspective view of a further embodiment of a silent modular link conveyor chain.
Figure 9:
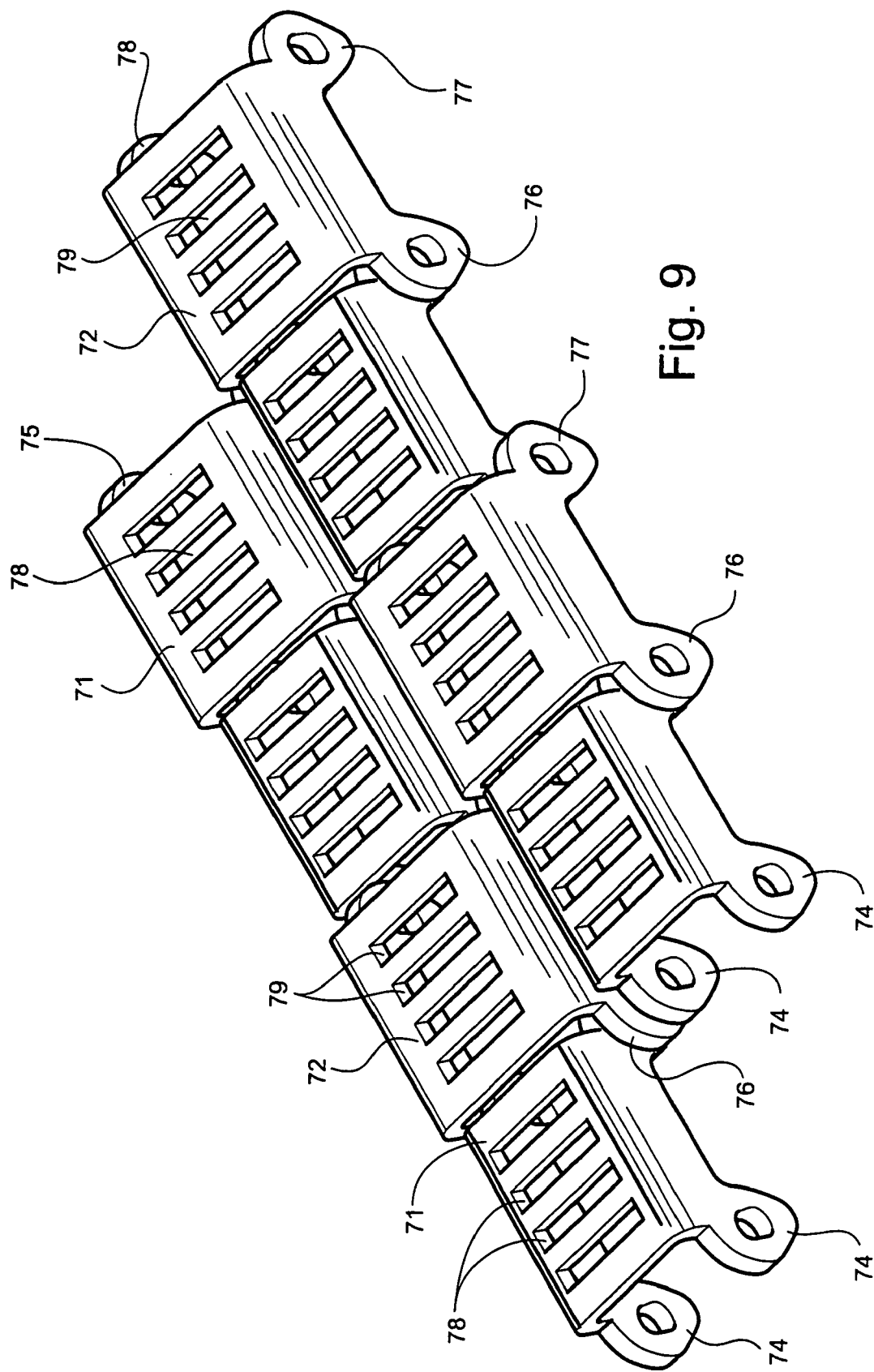
FIG. 9 is a perspective view of an assembled array of the modular conveyor links shown in FIG. 8.

Referring now to FIGS. 8 and 9, a further embodiment of a conveyor according to the present invention is shown at reference numeral 70. The conveyor 70 is formed from a first conveyor link 71 and a second conveyor link 72. The first conveyor link 71 includes pairs of teeth 74, 75 which are spaced to fit against an inside surface of and in alignment with teeth 76, 77 of the second conveyor link 72. Proper alignment of the teeth 75, 76 and teeth 74, 77 permit insertion of a link pin, not shown, that holds a multitude of conveyor links 71, 72 in a lengthwise and widthwise array forming the conveyor 70. See FIG. 9. The teeth 74, 75, 76, 77 are shaped as conventional silent chain teeth, meeting all of the standards set out above. As shown, the conveyor links 71, 72 include elongate, widthwise openings 78, 79 that reduce weight, permit drainage, or facilitate airflow, These openings may be any shape or size, dependent on application, or absent entirely when a imperforate surface is needed.

Articulation of the conveyor links around standard silent chain sprockets is thereby facilitated. Materials and fabrication techniques for the conveyor links 71 and 72 of conveyor 70 are as described above with reference to conveyor 10.

Figure 10:
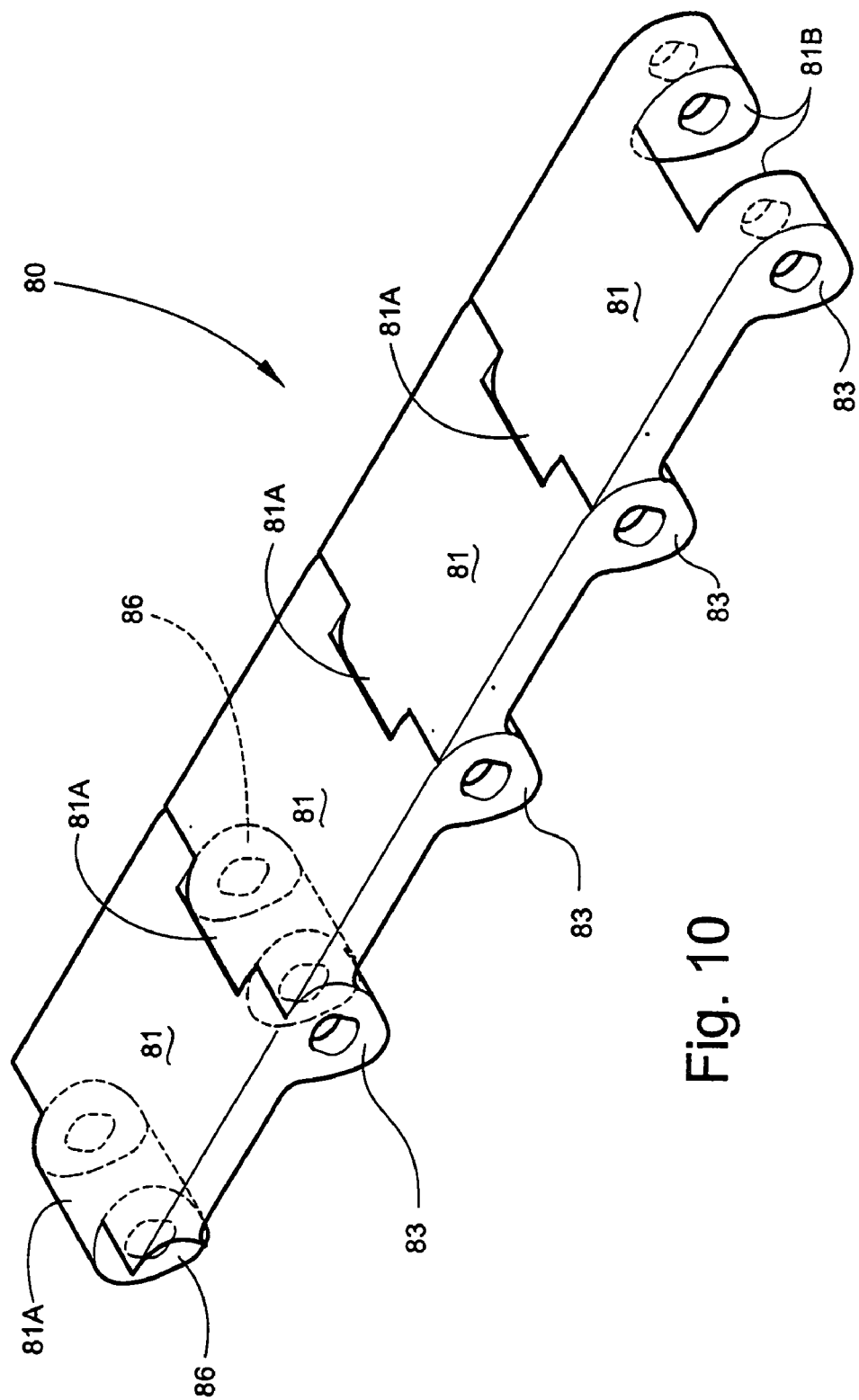
FIG. 10 is a perspective view of a further embodiment of a silent modular link conveyor chain.

Referring to FIG. 10, a further embodiment of a conveyor according to the invention is shown and indicated at reference numeral 80. The individual conveyor links 81 are formed in a male/female design with an outwardly-projecting forward end 81A of one conveyor link 81 fitting into a recess 81B in the trailing end of another like conveyor link 81. Teeth 83 are positioned, as shown, on opposing sides of the conveyor link 81. A single, relatively wide, tooth 86 is carried by the outwardly-projecting forward end 81A and permits the conveyor links 81 to be joined by alignment of teeth 83 with the tooth 86. A pin, not shown, is inserted through an opening in the aligned teeth 83 and 86, fastening the adjacent conveyor links 81 together. The entire conveyor having many conveyor links 81 is built in the same manner. Once inserted, a head is formed on the leading end of the pin to join the conveyor links 81 together. Of course, as many of the conveyor links 81 are assembled widthwise to make up a chain having the desired width held in the assembled state by a pin of suitable length.

The teeth 83, 86 are shaped as conventional silent chain teeth, meeting all of the standards set out above. Articulation of the conveyor links around standard silent chain sprockets is thereby facilitated. Materials and fabrication techniques for the conveyor links 81 of chain 80 are as described above with reference to conveyor chain 10.

Figure 11:
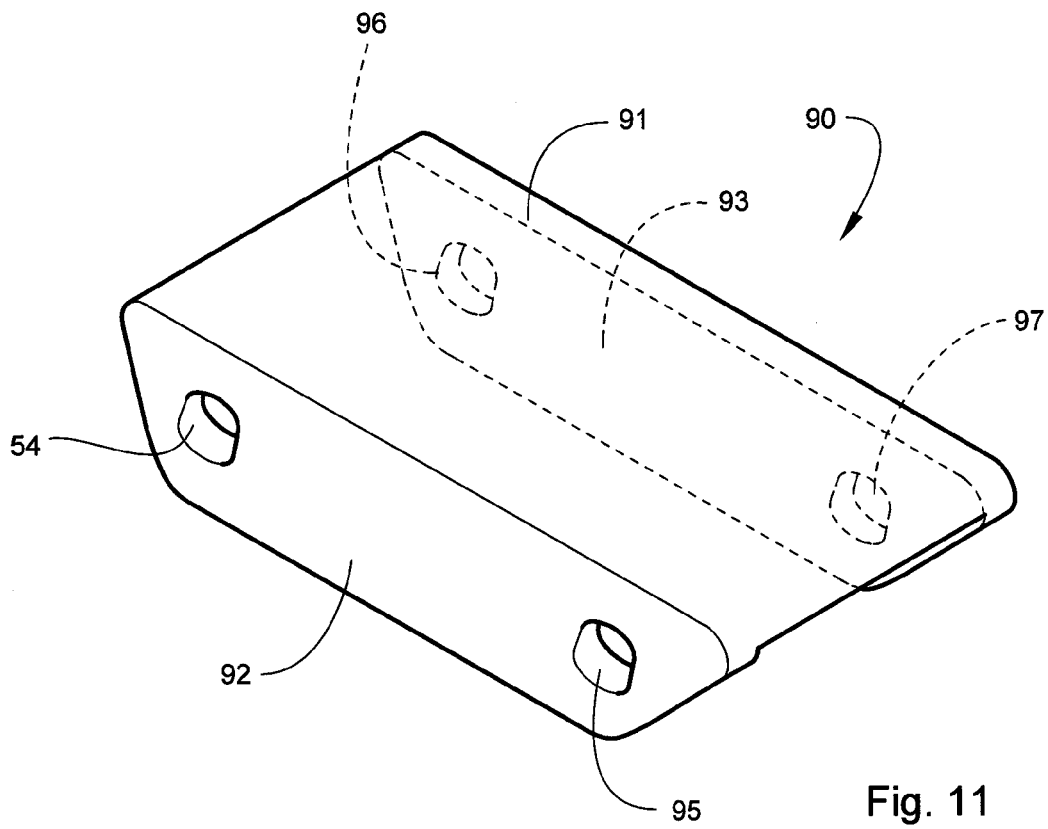
FIG. 11 is a perspective view of a load-bearing link of a modular conveyor chain.
Figure 12:
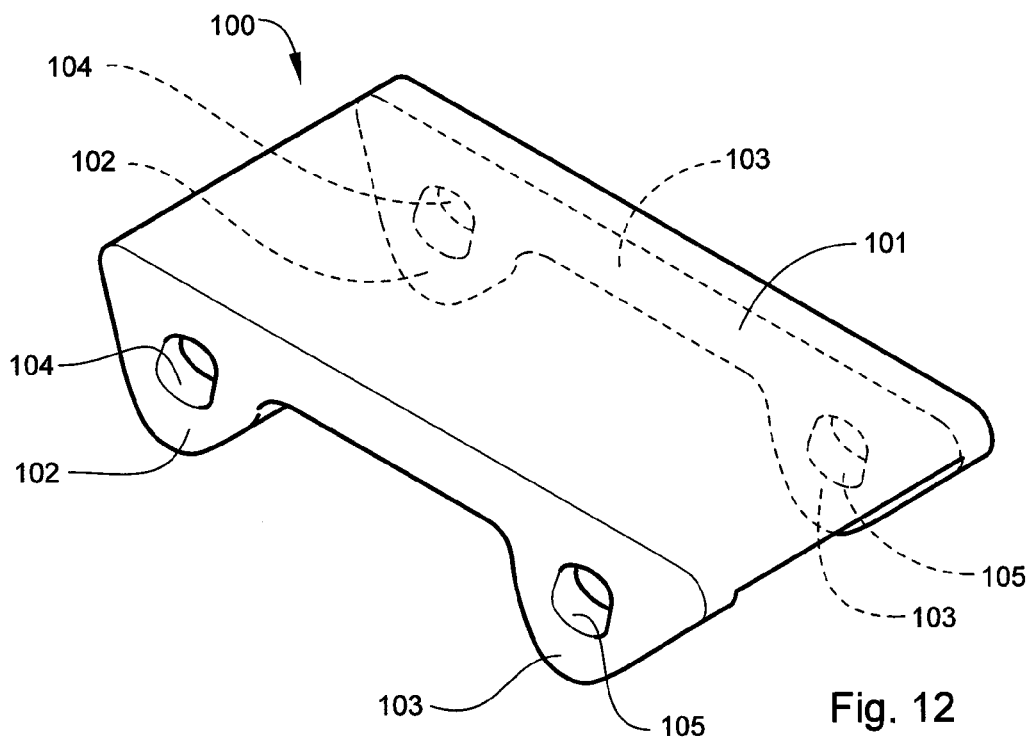
FIG. 12 is a perspective view of a driving link of a modular conveyor chain.

Referring now to FIGS. 11 and 12, a load-bearing link 90 and a driving link 100 are shown. The load-bearing link 90 includes a support 91 and two downwardly depending load-bearing plates 92, 93. The load-bearing plates 92, 93 have respective holes 94, 95, and 96, 97 for insertion of link pins.

The driving link 100 includes a support 101 and two pairs of downwardly depending drive silent chain teeth 102, 103. The teeth 102, 103 have respective holes 104 and 105 for insertion of link pins.

Figure 13:
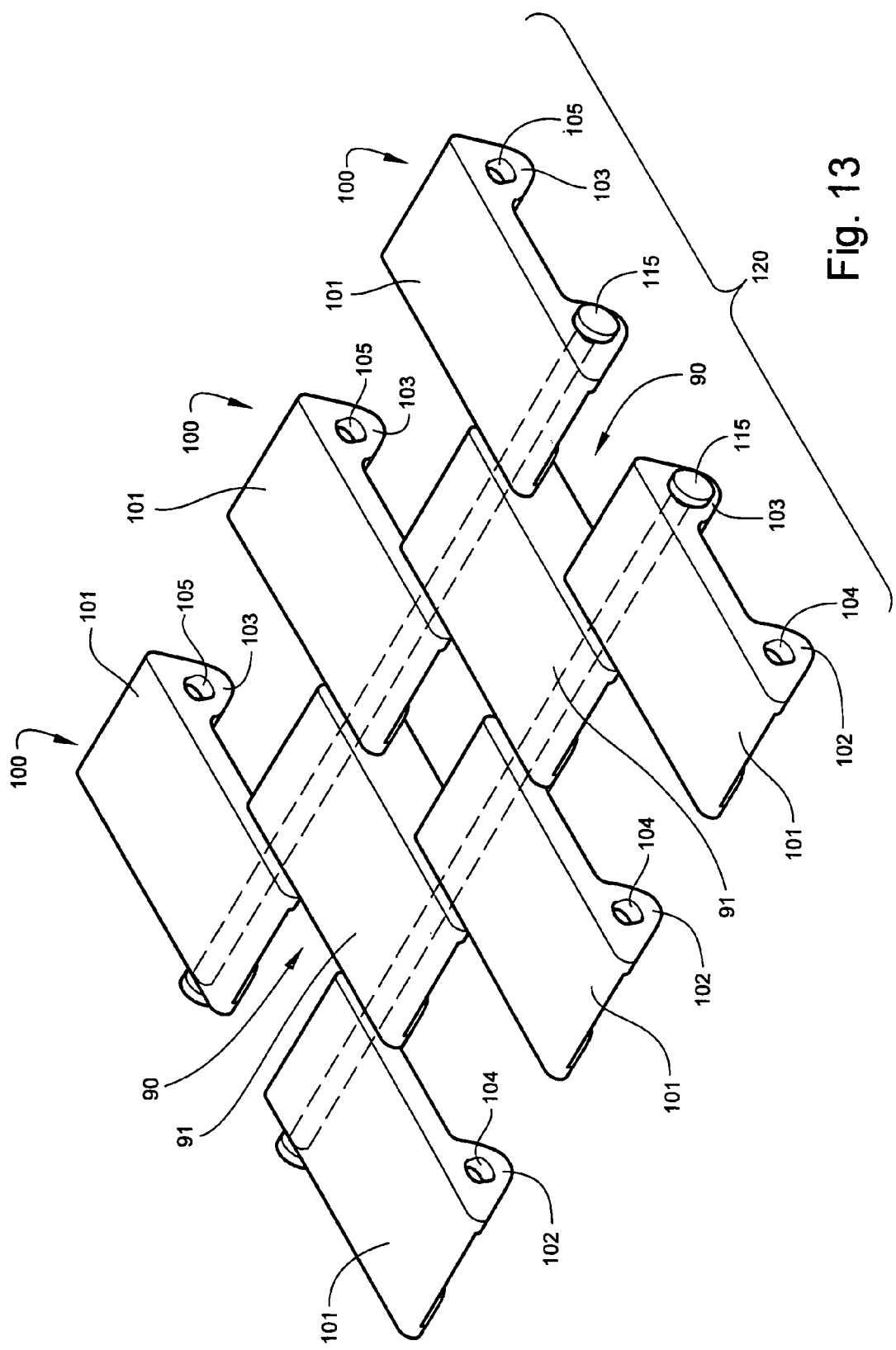
FIG. 13 is a perspective view of a conveyor assembled with driving and load-bearing links.

Referring now to FIG. 13, the load-bearing links 90 and driving links 100 are assembled as shown, being alternated longitudinally and laterally to define a conveyor 120 of predetermined width and length. Pins 115 extend through the aligned holes, as shown and link together the links 90 and 100. The teeth 102, 103 mate with a sprocket, see, for example, sprocket 140 of FIG. 14, to drive the conveyor 120. The load-bearing plates 92, 93 of the load-bearing links 90 ride in grooves in the sprocket and provide additional load-bearing capacity to the conveyor 120. The load-bearing plates 92, 93 also assist in accurately guiding the conveyor 120 on the sprocket and along the length of the conveyor 120.

Materials and fabrication techniques for the conveyor 120 is as described above with reference to conveyor chain 10.

Referring now to FIGS. 14 and 15, a combination driving and load-bearing conveyor link 130 is shown, and includes a support 131 on which items to be conveyed are supported. The conveyor link 130 also includes pairs of silent chain teeth 132, 133 and three load-bearing plates 135, 136, 137, each of which also includes pairs of holes 138, 139. The conveyor link 130 is adapted to ride in a sprocket 140. The teeth 132, 133 are received between sprocket teeth 140 for being moved along the length of the conveyor, and the load-bearing plates 135, 136, 137 extend into grooves 142, 143, 144, respectively. The load-bearing plates 135, 136, 137 perform dual functions-they guide the chain into alignment with the sprocket 140 by fitting into the grooves in the sprocket face, and they support loads being carried on the conveyor by riding on a wear plate positioned beneath the chain. This feature substantially reduces the load on the teeth 132, 133 and on the sprocket 140 by spreading the load. The load-bearing plates 135, 136, 137 may be integrally-formed by cutting and bending areas of the support 131. Alternatively, the load-bearing plates 135, 136, 137 may be formed by welding or otherwise attaching separately-formed plates to the conveyor link 130.

Figure 16:
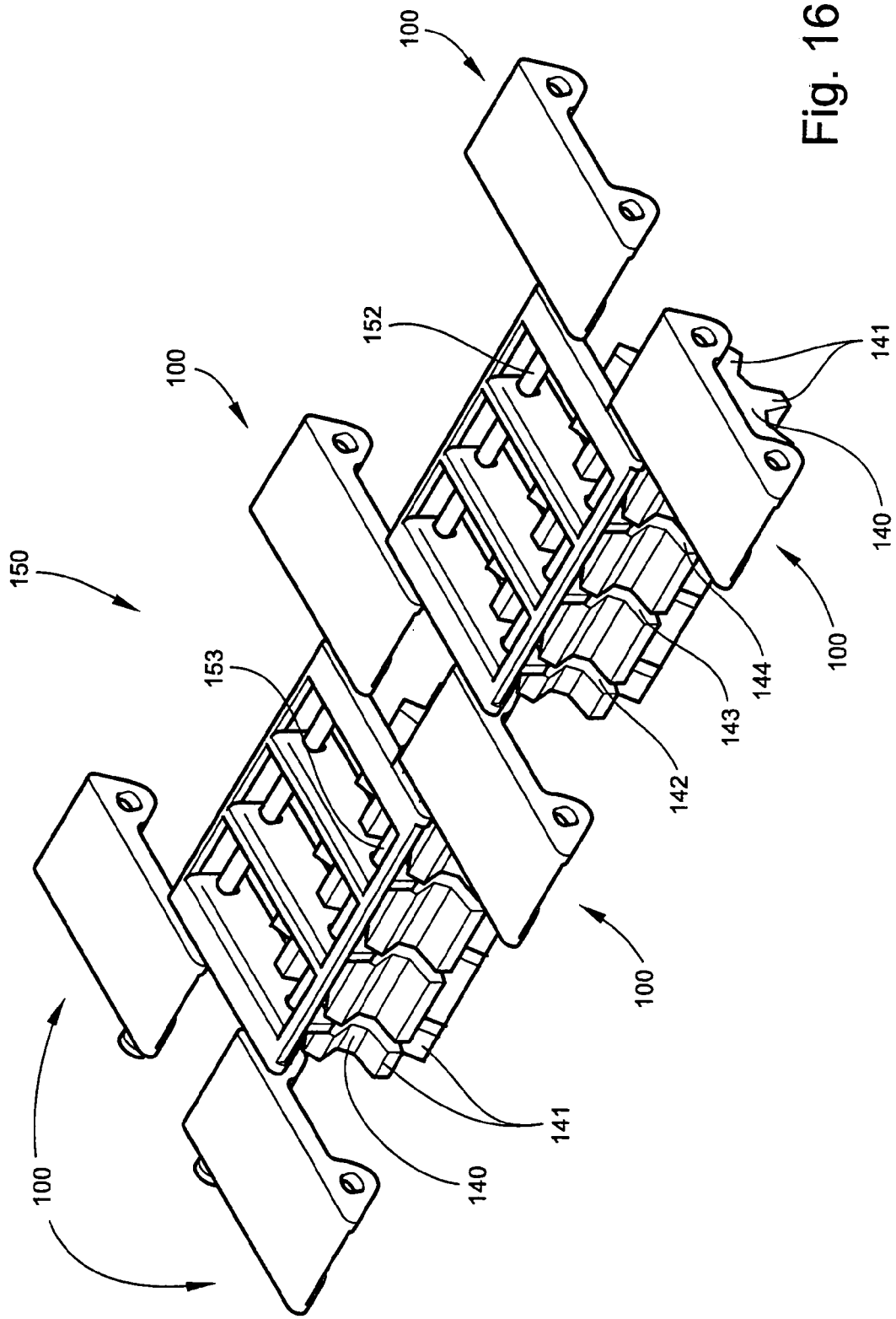
FIG. 16 is a perspective view of a section of conveyor formed from the conveyor links shown in FIGS. 12, 14 and 15.

A complete segment of a conveyor 150 is shown in FIG. 16, and is assembled with, for example, driving links 100 and conveyor links 130. As shown, conveyor links 130 are connected by alternately-positioned driving links 100. Pins 152, 153 extend through the aligned, concentric holes, as shown, and permit a conveyor 150 of predetermined length and width to be constructed. The resulting conveyor 150 has a high degree of positive driving force, tracking accuracy and wear resistance.

All of the embodiments disclosed above may incorporate an end protector link in accordance with the disclosure of applicant's pending patent application Serial No. PCT/US03/05973. In many applications, the chain is operated in a path that is bounded by lateral guides, wear strips, or other objects located on either or both sides of the chain. As the chain moves along this path, the ends of the pins projecting from the sides of the chain and the conveyor link on the outermost extremity of the chain may rub against the lateral guides, wear strips, or other objects. Eventually this rubbing action will abrade or damage the heads on the ends of these pins. Such wear may also damage links at the outermost extremity of the chain. If the damage or wear to pin heads or links is sufficient the pins and/or links may come out of the chain assembly, effectively destroying the integrity of the chain and damaging the conveying system. The protector link captures and retains first and second elongate link pins of a multi-link conveyor chain, and includes an outerwall defining a protective bearing surface, a spacerwall carried by the outer wall, and an inner wall carried by the spacer wall in spaced-apart relation to the outer wall and having a retainer aperture for capturing and retaining respective enlarged heads of the first and second link pins between facing surfaces of the outer wall and the inner wall. The protective bearing surface of the outer wall is adapted for being engaged by wearing surfaces past which the conveyor moves to protect the enlarged heads of the link pins to exposure to the wearing surfaces. In addition, modular conveyor links of the various types described above may be incorporated into chains that also include conventional silent chain links.

A silent modular conveyor and conveyor links of several designs are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A silent modular conveyor link adapted for assembly with multiple complementary links to form a conveyor, comprising:
    (a) a support for supporting items to be conveyed on the conveyor;
    (b) a pair of parallel sides integrally-formed with and extending downwardly from opposing side edges of the support, the sides and support cooperating to form an open channel;
    (c) a plurality of silent teeth extending downwardly from each of the sides and positioned for mating engagement with a sprocket gear and for overlapping concentric alignment with teeth in a complementary link for articulating movement relative to the complementary link; and
    (d) an opening in at least some of the teeth for receiving a link pin for connecting the multiple conveyor links together to form an endless conveyor.

2. A conveyor link according to claim 1, wherein the teeth are integrally-formed with the sides.

3. A conveyor link according to claim 1, wherein the conveyor link comprises a first pair of coplanar teeth positioned in spaced-apart relation on a first one of the respective sides and a second pair of coplanar teeth positioned in spaced-apart relation on a second one of the respective sides, the conveyor link adapted for being attached by a link pin to a like conveyor link to form a conveyor.

4. A conveyor link according to claim 3, wherein the support includes at least one opening therein.

5. A conveyor link according to claim 4, wherein the conveyor links are adapted for being connected together side-to-side and end-to-end to form an endless conveyor having a length and width that is a predetermined multiple of the length and width of a single conveyor link.

6. A silent modular conveyor link adapted for assembly with multiple complementary links to form a conveyor, comprising:
    (a) a support for supporting items to be conveyed on the conveyor;
    (b) a flair of parallel sides integrally-formed with and extending downwardly from opposing side edges of the support, the sides and support cooperating to form an open channel;
    (c) a pair of coplanar silent teeth extending downwardly from and positioned on opposing ends of each of the sides for mating engagement with a sprocket gear and for mating alignment with teeth in a complementary link for articulating movement relative to the complementary link; and
    (d) an opening in at least some of the teeth for receiving a link pin for connecting the multiple conveyor links together to form an endless conveyor.

7. A modular conveyor, comprising:
    (a) a plurality of first conveyor links, each of the first conveyor links comprising:
        (i) a support for supporting items to be conveyed on the conveyor;
        (ii) a pair of parallel sides integrally-formed with and extending downwardly from opposing side edges of the support, the sides and support cooperating to form an open channel;
        (iii) a plurality of coplanar silent teeth extending downwardly from each of the sides and positioned for mating engagement with a sprocket gear;
        (iv) an opening in at least some of the teeth for receiving a link pin;
    (b) a plurality of second conveyor links, each of the second conveyor links comprising:
        (i) a support for supporting items to be conveyed on the conveyor;
        (ii) a pair of parallel sides integrally-formed with and extending downwardly from opposing side edges of the support, the sides and support cooperating to form an open channel;
        (iii) a plurality of coplanar silent teeth extending downwardly from each of the sides, the teeth being spaced and positioned to reside concentrically-adjacent to respective teeth of the first conveyor links for alignment with and articulating movement relative to the first conveyor links, wherein the first conveyor links have an outside width substantially equal to an inside width of the second conveyor links; and
        (iii) an opening in at least some of the teeth for receiving a link pin for connecting the plurality of first conveyor links and the plurality of second conveyor links together to form an endless conveyor wherein the plurality of first conveyor links and second conveyor links alternate along the length of and across the width of The conveyor.

8. A conveyor according to claim 7, wherein the silent teeth of the second conveyor links are shaped and spaced for mating engagement with the sprocket gear.

9. A conveyor according to claim 7, wherein at least some of the first conveyor links or at least some of the second conveyor links have openings in the their respective supports.

* * * * *

UNITED STATES PATENT AND TRADEMARK OFFICE
CERTIFICATE OF CORRECTION

PATENT NO. : 7,267,221 B2  Page 1 of 1
APPLICATION NO. : 10/830817
DATED : September 11, 2007
INVENTOR(S) : William C. Hall It is certified that error appears in the above-identified patent and that said Letters Patent is hereby corrected as shown below:

In column 8, line 3, delete "flair" and insert therefor -- pair --.

In column 8, line 54, delete "The" and insert therefor -- the --.

Signed and Sealed this

Ninth Day of June, 2009

JOHN DOLL
*Acting Director of the United States Patent and Trademark Office*